United States Patent [19]
Koretz

[11] Patent Number: 5,519,958
[45] Date of Patent: May 28, 1996

[54] ICE FISHING RIG

[76] Inventor: Darren Koretz, Box 616, Alix, Alberta, Canada, T0C 0B0

[21] Appl. No.: 357,744

[22] Filed: Dec. 16, 1994

[51] Int. Cl.$^6$ ................................................. A01K 85/01
[52] U.S. Cl. ........................... 43/17; 43/21.2; 43/18.1
[58] Field of Search ............................... 43/16, 17, 18.1, 43/20, 21.2

[56] References Cited

U.S. PATENT DOCUMENTS

| | | | |
|---|---|---|---|
| 446,596 | 2/1891 | Hackett | 43/17 |
| 2,238,127 | 4/1941 | Nissen . | |
| 2,541,307 | 2/1951 | Teel . | |
| 2,910,797 | 11/1959 | Cucuro . | |
| 2,934,849 | 5/1960 | Kampa | 43/17 |
| 3,143,822 | 8/1964 | Schooley . | |
| 3,147,563 | 9/1964 | Molter . | |
| 3,685,195 | 8/1972 | Merryweather | 43/18.1 |
| 4,567,686 | 2/1986 | Akom . | |
| 4,621,446 | 11/1986 | Anderson . | |
| 4,805,336 | 2/1989 | Heyerman . | |
| 4,837,965 | 6/1989 | True . | |
| 4,905,398 | 3/1990 | Botbyl | 43/17 |
| 5,163,243 | 11/1992 | Wold, Jr. . | |
| 5,444,934 | 8/1995 | LaTouche | 43/21.2 |

FOREIGN PATENT DOCUMENTS

| | | |
|---|---|---|
| 671339 | 10/1963 | Canada . |
| 1149161 | 5/1983 | Canada . |
| 2021751 | 1/1992 | Canada . |
| 2027879 | 4/1992 | Canada . |
| 2060101 | 7/1993 | Canada . |
| 0124299 | 3/1949 | Switzerland ........................... 43/18.1 |

Primary Examiner—Richard K. Seidel
Assistant Examiner—James Miner
Attorney, Agent, or Firm—R. H. Barrigar; Lynn S. Cassan

[57] ABSTRACT

There is an ice fishing rig and a kit for the same. The rig is selectively adjustable between 'tip-up' and 'rod-and reel' configurations. The kit comprises a handle, an elongated reel securable to the handle, and a rod selectively securable to the handle in a forwardly projecting position or a rearwardly projecting position. The rod includes a fishing line guide, eg. a hole. There is also means cooperative with the handle for selectively supporting the rig in the 'tip-up' configuration over an ice fishing hole. The latter means preferably includes a pair of rods, each having a length greater than a width of a typical ice fishing hole. Preferably the rig also includes a spring indicator cooperatively adapted to alert an fisherman when a fish pulls on a fishing line extending from the rig operatively in the 'tip-up' position. The spring indicator preferably is attachable at one end thereof to a side of the handle opposite to a side where the reel is attachable, such that a free end of the spring is bendable over to and releasably securable at about the pivot axis between the handle and the reel.

11 Claims, 3 Drawing Sheets

ICE FISHING RIG

This invention relates to an ice fishing rig which can be used selectively in a regular 'rod-and-reel' configuration or in a 'tip-up' configuration. When in use in the 'tip-up' configuration the rig can, by releasing a spring indicator, alert a fisherman to a fish on the line.

'Tip-up' ice fishing rigs with spring indicators are well known. Different methods of releasing a spring indicator are described in, for example, U.S. Pat. No. 4,567,686, where such a spring is released from a catch when the catch is moved by a reel, in turn moved by a pull on the fishing line. In published Canadian Patent Application Serial No. 2,021,751, a steel spring is released from a catch on a reel when the reel is rotated by a pulling on the fishing line. See also U.S. Pat. No. 4,621,446.

There are also ice fishing rigs which are in a static 'rod-and-reel' configuration, but these are not as convenient to use and reflect a substantial degree of compromise of the preferred features of a 'tip-up' configuration.

There is a need for an ice fishing rig which obtains all of the advantages of a 'tip-up' configuration, including a spring indicator, but which can also be used as a conventional rod-and-reel.

SUMMARY OF THE INVENTION

The invention provides in one aspect a kit for an ice fishing rig. The rig is selectively adjustable between 'tip-up' and 'rod-and reel' configurations. The kit comprises a handle having forward and rearward ends, an elongated reel pivotally securable to the handle, and means for pivotally securing the reel to the handle. The latter means is preferably a carriage bolt and nut. There is also a rod selectively fixedly securable at a securable section thereof to the handle in a forwardly projecting position or a rearwardly projecting position. The rod includes a fishing line guide means, preferably a conventional guide hole, adjacent an end thereof distal to the securable section. There is also means for selectively fixedly securing the rod to the handle, and means cooperative with the handle for selectively supporting the rig in the 'tip-up' configuration over an ice fishing hole. The latter means preferably includes a pair of rods, each having a length greater than a width of a typical ice fishing hole.

The reel and rod preferably are selectively pivotable about a common pivot axis. The rod preferably is selectively fixedly securable at the securable section to the handle forwardly or rearwardly of the pivot axis.

The kit preferably also includes a spring indicator cooperatively adapted to alert an fisherman when a fish pulls on a fishing line extending from the rig operatively in the 'tip-up' position. The spring indicator preferably is attachable at one end thereof to a side of the handle opposite to a side where the reel is attachable, such that a free end of the spring is bendable over to and releasably securable at about the pivot axis between the handle and the reel.

In another aspect the invention also provides an ice fishing rig comprising the components of the above described kit in various stages of assembly, including a completed assembly.

BRIEF DESCRIPTION OF THE FIGURES

In drawings which illustrate preferred embodiments of the present invention.

DESCRIPTION OF PREFERRED EMBODIMENTS

Figure 1:
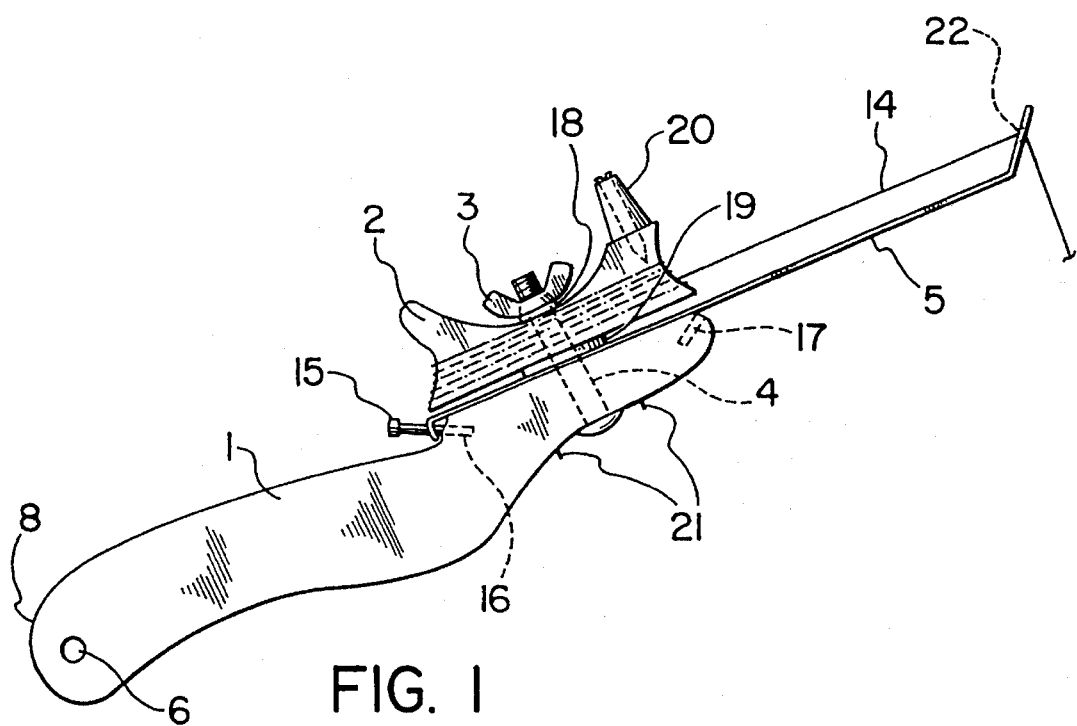
FIG. 1 is a side view of a prototype fishing rig in the 'rod-and-reel' configuration.
Figure 2:
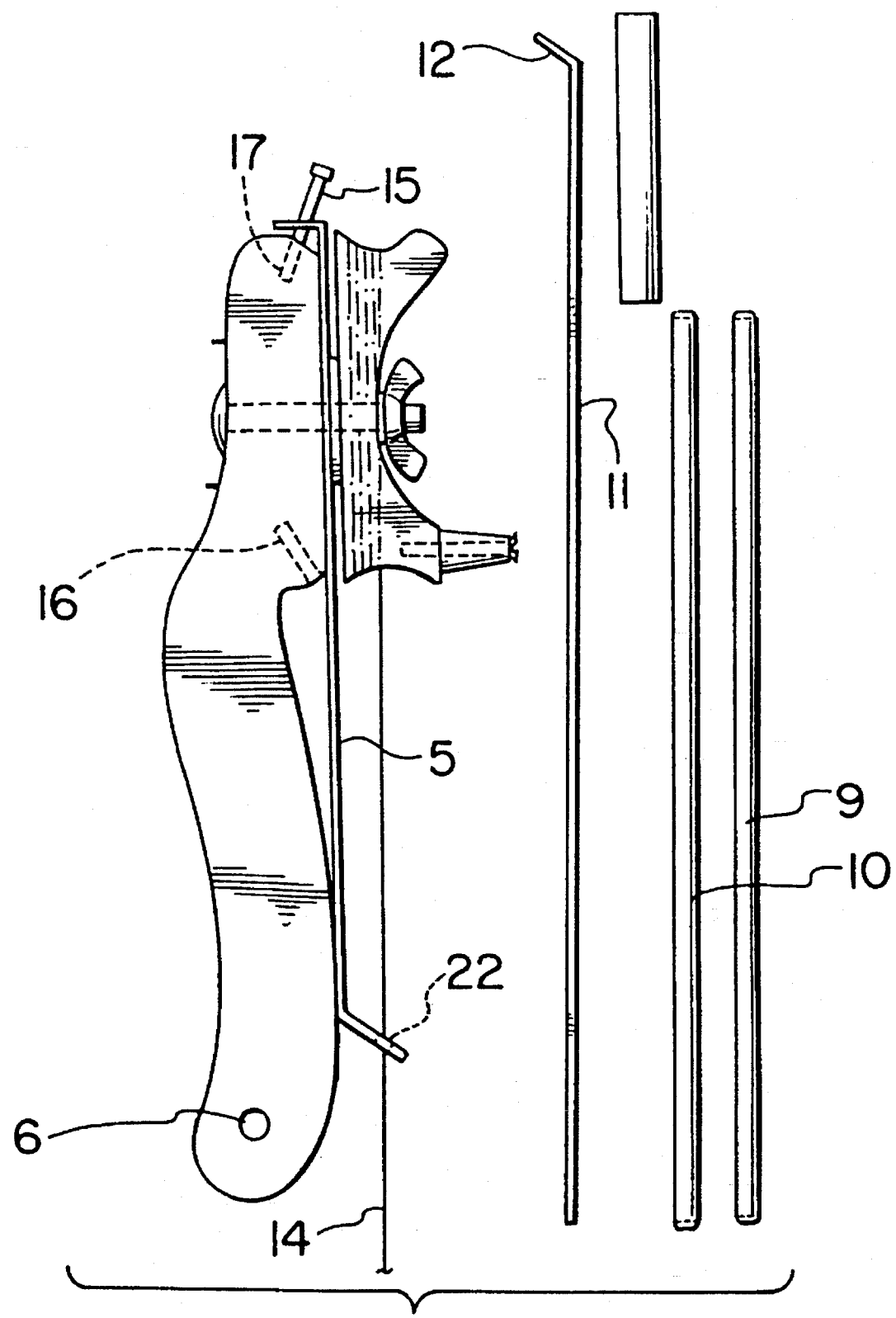
FIG. 2 is a side view of the rig of FIG. 1 which has been adjusted to the 'tip-up' configuration, together with some disassembled components shown to relative scale for assembly and use with the rig in the latter configuration.
Figure 3:
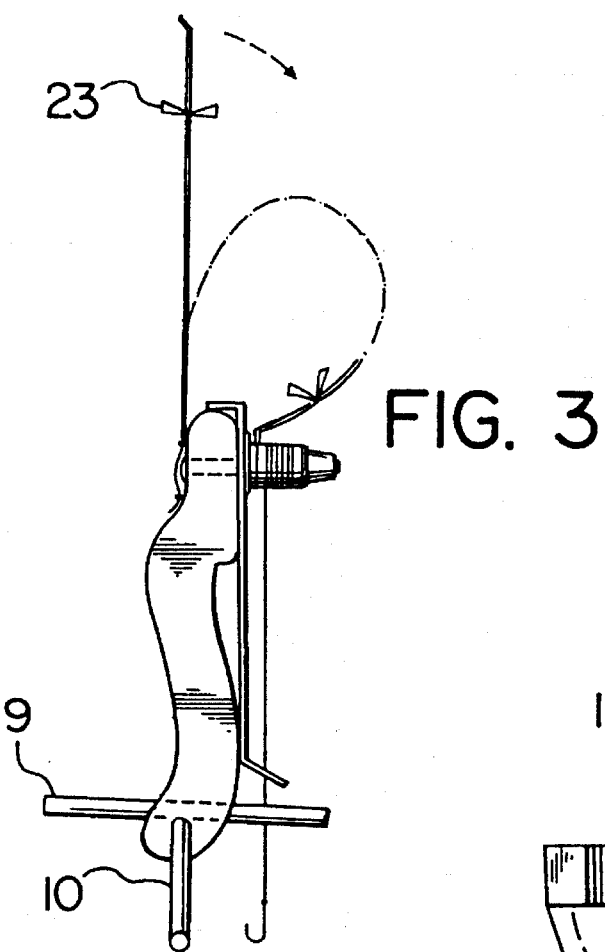
FIG. 3 is a side view of the rig of FIG. 2 with assembled components and ready for use over an ice fishing hole; and, FIG. 4 is a front view of the rig of FIG. 3.

In one preferred embodiment best described with reference to the Figures, the ice fishing rig comprises a handle 1, preferably made of wood or plastic, an elongated reel 2 attached by a nut 3 (preferably a wing nut) and carriage bolt 4 in conjunction with washers 18 and 19, to a top (or front) end of the handle 1, and an arm 5, preferably made of steel, pivotable around the carriage bolt 4 between the reel 2 and the handle 1. The arm 5 can be secured into a forwardly extending position for a 'rod-and-reel' configuration shown in FIG. 1, or into a rearwardly (or downwardly) extending position to provide an ice fishing 'tip-up' configuration shown in FIGS. 2–4. The pin or screw 15 may be used to secure one or the other of such positions at hole 16 or 17 respectively. Reel grip 20 is for turning the reel.

Figure 4:
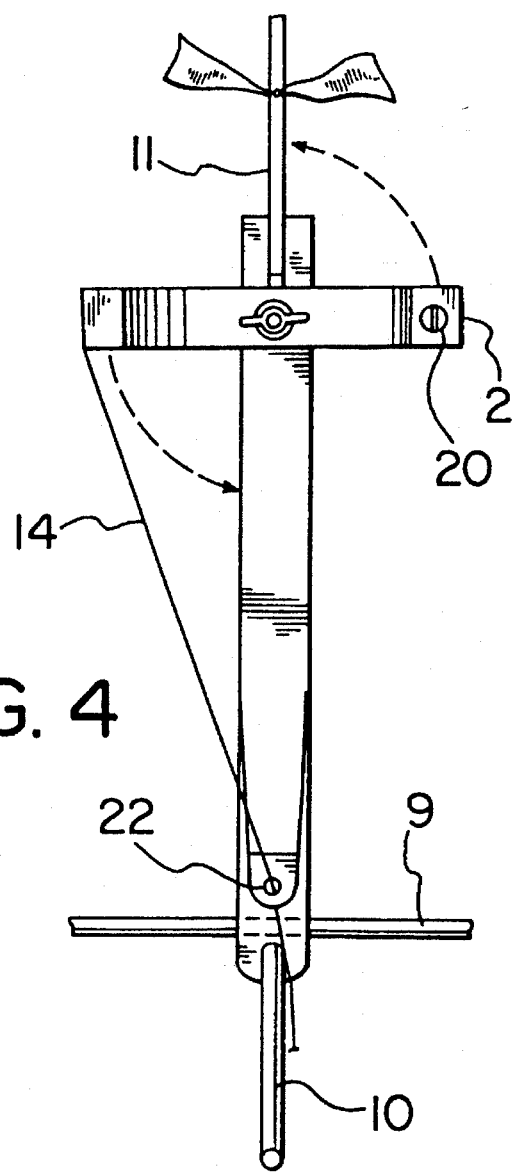

Transverse holes 6,7 in a bottom (or back) end 8 of the handle 1 facilitate the securing of rods 9,10 for use in positioning the rig over an ice fishing hole when the rig is in the ice fishing 'tip-up' position. The rods can be slidably removed for when the rig is to be used in a rod-and-reel configuration. A spring 11, preferably a spring steel, is secured at one of its ends preferably by clamps 21 to a side of the handle 1 opposite the reel 2 such that a free end 12 of the spring may be bent over (see arrow 13 in FIG. 3) and releasably secured to a position adjacent the carriage bolt 4 and between where the reel 2 and the arm 5 pivot on the carriage bolt 4, most preferably between washer 18 and arm 5. When the spring is so positioned, tension is thereby applied by the spring to the inner side of the elongated reel 2 and wing nut. Such tension acts to stabilize the reel in a pre-set position. The pre-set position is such that the longitudinal axis of the reel 2 is transverse to the longitudinal axis of the handle 1, as shown in FIG. 4. Note the angle of action that the fishing line has on the reel 2. The latter facilitates, when the rig is in use, the release of the temporarily secured end 12 of the spring when the reel 2 is turned by reason of a fish pulling on a line 14 extending from the reel 2, through a guide-hole 22 in an end of the arm 5, and into an ice fishing hole, ie. when the rig is in the 'tip-up' configuration.

The spring preferably includes a brightly coloured flag 23 near the free end 12. When the spring is released due to pulling from a fish on the line, the resulting upright flag alerts the fisherman.

I claim:

1. A kit for an ice fishing rig, said rig being selectively adjustable between 'tip-up' and 'rod-and reel' configurations, said kit comprising:

a handle having forward and rearward ends;

an elongated reel pivotally securable to the handle and means for pivotally securing said reel to said handle;

a rod being selectively fixedly securable at a securable section thereof to the handle in a forwardly projecting position or a rearwardly projecting position, and having a fishing line guide means adjacent an end thereof distal to said securable section;

means for selectively fixedly securing said rod to said handle; and, means cooperative with the handle for selectively supporting the rig in the 'tip-up' configuration over an ice fishing hole.

2. The kit of claim 1 wherein the reel and rod are selectively pivotable about a common pivot axis.

3. The kit of claim 2 wherein the rod is selectively fixedly securable at said securable section to the handle forwardly or rearwardly of the pivot axis.

4. The kit of claim 1 wherein there is also a spring indicator cooperatively adapted to alert an fisherman when a fish pulls on a fishing line extending from the rig operatively in the 'tip-up' position.

5. The kit of claim 4 wherein the spring indicator is attachable at one end thereof to a side of the handle opposite to a side where the reel is attachable, such that a free end of the spring is bendable over to and releasably securable at about the pivot axis between the handle and reel.

6. An ice fishing rig, said rig being selectively adjustable between 'tip-up' and 'rod-and reel' configurations, said rig comprising:

a handle having forward and rearward ends;

an elongated reel pivotally secured to the handle by pivoting means;

a rod fixedly secured, at a securable section thereof by releasable securing means, to the handle selectively in a forwardly projecting position or a rearwardly projecting position, and having a fishing line guide means adjacent an end thereof distal to said securable section; and, means cooperative with the handle for selectively supporting the rig in the 'tip-up' configuration over an ice fishing hole.

7. The rig of claim 6 wherein the reel and rod are selectively pivotable about a common pivot axis.

8. The rig of claim 7 wherein the rod is fixedly secured at said securable section to the handle forwardly or rearwardly of the pivot axis.

9. The rig of claim 6 wherein there is also a spring indicator cooperatively adapted to alert a fisherman when a fish pulls on a fishing line extending from the rig operatively in the 'tip-up' position.

10. The rig of claim 9 wherein the spring indicator is attachable at one end thereof to a side of the handle opposite to a side where the reel is attachable, such that a free end of the spring is bendable over to and releasably securable at about the pivot axis between the handle and the reel.

11. The rig of claim 6 wherein the means cooperative with the handle for selectively supporting the rig in the 'tip-up' configuration comprises a pair of rods, each having a length greater than a width of a typical ice fishing hole.

* * * * *